United States Patent Office 2,715,037
Patented Aug. 9, 1955

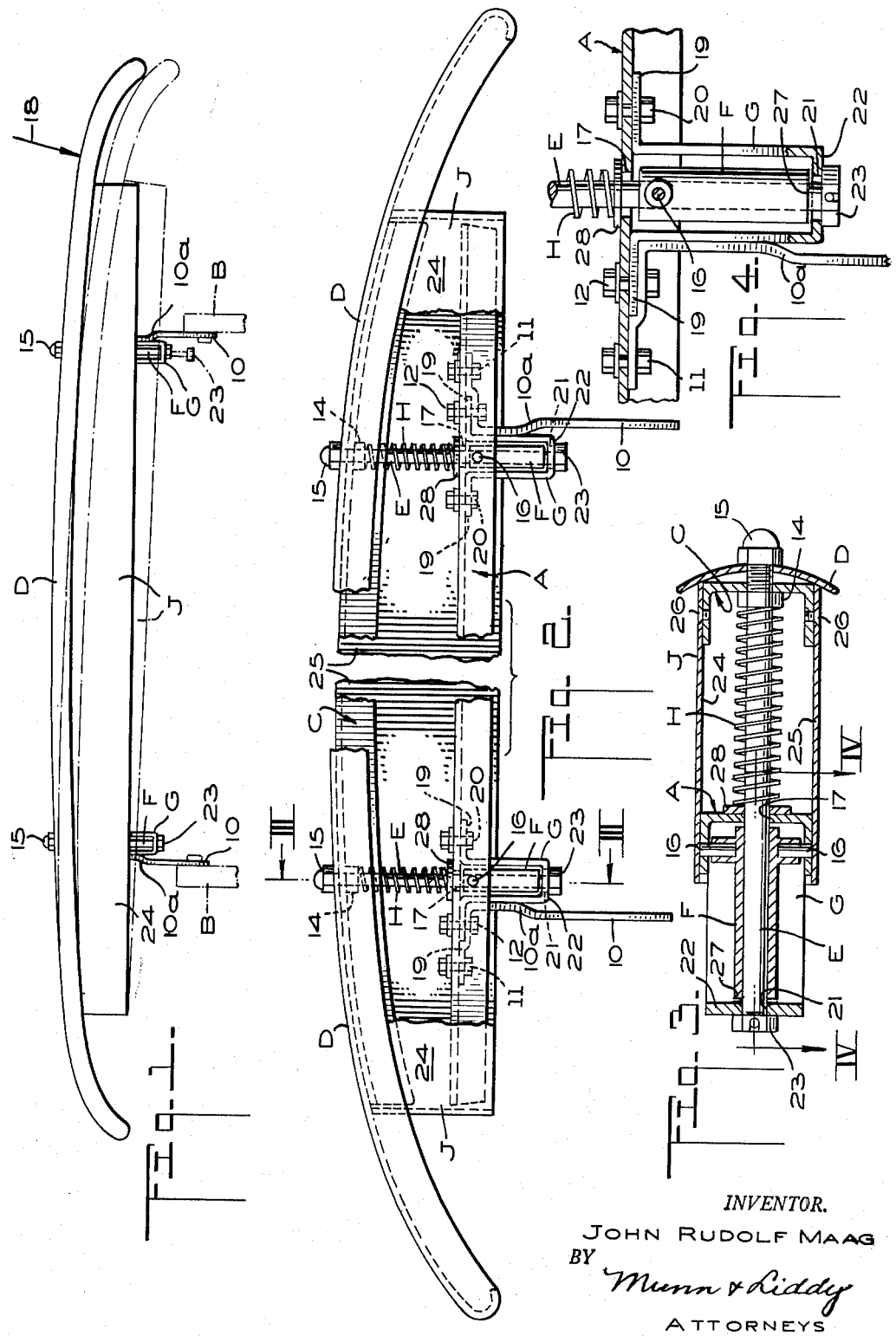

2,715,037

RESILIENT BUMPER

John Rudolf Maag, San Francisco, Calif.

Application May 19, 1952, Serial No. 288,704

1 Claim. (Cl. 293—85)

My invention relates to a resilient bumper; and embodies improvements over the bumper disclosed in my United States Letters Patent No. 2,593,586, dated April 22, 1952. It consists of the combinations, constructions, and arrangement of parts, as hereinafter described and claimed.

Among the various objects of the present invention, it is proposed to provide a resilient bumper, which is designed to withstand a rather severe impact, yet arranged to return to normal position after the force of the blow has been released.

More specifically stated, my bumper contemplates the provision of an inner member, which is made for attachment to a chassis frame, and an outer member having an impact bar supported thereon. The outer member is resiliently supported, and is guided for movement toward and away from the inner member, or into angular relation therewith, depending upon the direction of the blow striking against the impact bar. The guide means for this purpose are arranged to assure return of the outer bar-supporting member to an initial position under all normal conditions.

Furthermore, it is intended herein to conceal and protect these inner and outer members of the bumper, as well as springs interposed therebetween, from normal view, thus enhancing the general appearance and durability of the resilient bumper.

Other objects and advantages will appear as the specification continues. The novel features will be pointed out in the claims hereunto appended.

Drawing

For a better understanding of the invention, reference should be had to the accompanying drawing, forming part of this application, in which:

Figure 1 is a top plan view of my resilient bumper, illustrating the several parts in retracted position by dot-dash lines;

Figure 2 is an enlarged view of the end portions of the bumper, parts being broken away to disclose the interior constructions;

Figure 3 is a vertical sectional view taken along the plane III—III of Figure 2; and Figure 4 is a fragmentary horizontal sectional view taken along the line IV—IV of Figure 3.

While I have shown only the preferred form of my invention, it should be understood that various changes, or modifications, may be made within the scope of the annexed claims without departing from the spirit thereof.

Detailed description

In carrying my invention into practice, I provide a substantially horizontally-disposed inner member A, which has been shown as being formed from a channel bar. This member has arms 10—10 fixed to the web thereof by bolts 11 and 12, or other suitable fastening means. The arms thus provided are arranged for attachment to a chassis frame B, as suggested in Figure 1, at the front or back of a vehicle.

As clearly shown in Figures 1 to 3, inclusive, a movable outer member C is positioned in spaced-apart and general parallel relation with the inner member A, and likewise may be made from a channel bar. The outer member C has an impact bar D supported thereon for movement therewith.

Broadly speaking, the outer member C is movable toward and away from the inner member A, and into angular relation therewith. However, these movements are controlled so as to make certain that the movable member C will return to its normal position under ordinary circumstances.

For this purpose, I provide a pair of spaced-apart supporting rods E—E, which are secured to the outer member C and the impact bar D by clamping nuts 14—15 threaded upon these rods. The latter are slidably disposed in guide sleeves F—F, which are hingedly secured by trunnion pins 16—16 to the flanges of the inner member A for swinging laterally about substantially vertical axes (see Figure 3).

It will be noted that the rods E—E project through openings 17—17 provided in the web of the stationary inner member A. Referring to Figures 2 and 4, these openings are shown as being elongated horizontally so that the supporting rods E—E may shift laterally therein. This will allow the outer member C and its impact bar D to move into angular positions relative to the stationary inner member A, for instance, due to the impact bar being struck by a force indicated by the arrow 18 in Figure 1. However, the upper and lower walls of the openings 17—17 contact with the rods E—E from above and below, respectively, to preclude vertical movement of these rods.

As a further structural feature, I provide a pair of stirrups G—G, which are arranged in straddling relation with the guide sleeves F—F (see Figures 2 and 4). These stirrups are fashioned with outwardly-turned feet 19, which are fixed to the web of the inner member A by the bolts 12, previously mentioned, and additional bolts 20.

The inner ends of the supporting rods E—E extend through slots 21—21 provided in end walls 22 of the stirrups. These slots are elongated horizontally to permit the supporting rods to shift laterally (see Figures 2 and 4). It will be observed from Figure 3 that the upper and lower walls of the openings 21—21 bear against the rods E—E from above and below, respectively, to restrain these rods from moving vertically.

For limiting separation of the movable member C with respect to the stationary member A, nuts 23 are threaded onto the inner ends of the supporting rods E—E, and are buttable against the walls 22—22 of the stirrups. Compression springs H—H encircle these rods and are interposed between the inner and outer members A and C, respectively, to yieldingly urge them apart; that is, into the normal position shown in Figure 2 of the drawing.

In order to conceal and protect the members A—C and the springs H—H, and thereby enhance the appearance and durability of the resilient bumper, I provide a tubular casing J. The latter is telescoped over the inner and outer members to bridge the space therebetween. This casing has its top and bottom walls 24 and 25, respectively, anchored by screws 26 to the flanges of the outer member C (see Figure 3). However, the casing J is freely slidable over the inner member A so that the outer member C can swing horizontally into angular positions with respect to the stationary member A.

Ample clearances for the inner ends of the rods E—E and their nuts 23—23 are provided by offsetting the arms 10—10 outwardly at 10a—10a. Also, the ends 27—27 of the guide sleeve F—F are spaced from the walls 22—22 of the stirrups to allow horizontal swinging movement of the sleeves. (See Figures 3 and 4.) Washers 28—28 have been disclosed on the supporting rods as being arranged over the elongated openings 17—17 of the inner member A, and interposed between the latter and the springs H—H.

*Summary*

From the foregoing description it will be noted that my resilient bumper is attached by the arms 10—10 to the chassis frome B at the front or back of a vehicle. Normally, the movable member C and its impact bar D occupy their extended positions, as shown in Figure 2.

Upon being struck a blow, the springs H—H will yield, allowing the member C and impact bar D to move toward the stationary inner member A, and into angular position therewith, if necessary. The tolerances of the rods E—E and guide sleeves F—F are such as to permit this angular movement without binding action. Moreover, these sleeves may swing laterally independently of one another on their respective pins 16—16. The openings 17—17, guide sleeves F—F and slots 21—21 serve to support the rods E—E and hold them against vertical movement, while allowing these sleeves and rods to shift laterally.

As soon as pressure on the impact bar is released, the springs will return the movable member C and impact bar D to their normal positions. At this time, the nuts 23—23 will abut the stirrups G—G, preventing further separation of the members A—C. The casing J serves to conceal and protect many of the operating parts of the resilient bumper herein disclosed.

I claim:

In a resilient bumper of the character described: a channel-shaped inner member, defining a web having upper and lower flanges projecting therefrom; arms securing this member in fixed relation to a chassis frame; a movable outer member positioned in spaced-apart relation with the inner member; an impact bar abutting the outer members; a pair of supporting rods projecting through registering openings in the outer member and the impact bar, and having means thereon removably anchoring the impact bar to the outer member; a pair of horizontal guide sleeves disposed on the opposite side of the inner member from that of the outer member; vertically-disposed trunnion pins securing each of these sleeves to the flanges of the inner member for swinging of the sleeves in horizontal directions, independently of one another; the supporting rods projecting through openings provided in the web of this inner member, and being slidably disposed in the guide sleeves; compression springs encircling the supporting rods and being interposed between the inner and outer members, and arranged to yieldingly urge them apart; a pair of stirrups fixed to the inner member, each straddling one of the guide sleeves; the stirrups having transversely-extending end walls provided with slots therein through which the supporting rods extend; the sleeves extending substantially from the web of the inner member to the transverse end walls of the stirrups to give firm support to the rods; the openings in the web of the inner member and the stirrup slots all being elongated horizontally so that the supporting rods may shift laterally therein; the upper and lower walls of the web openings and the stirrup slots contacting with the rods from above and below, respectively, to preclude vertical movement of these rods; and means on the rods buttable against the transverse walls of the stirrups to limit separation of the outer member relative to the inner member.

References Cited in the file of this patent

UNITED STATES PATENTS

| 1,855,977 | Llobet | Apr. 26, 1932 |
| 2,094,739 | Geiger | Oct. 5, 1937 |
| 2,593,586 | Maag | Apr. 22, 1952 |

FOREIGN PATENTS

| 14,273 | Great Britain | 1914 |